US006974197B1

(12) United States Patent
Henry et al.

(10) Patent No.: US 6,974,197 B1
(45) Date of Patent: Dec. 13, 2005

(54) PORTABLE GLOVEBOX AND FILTRATION SYSTEM

(75) Inventors: Charles E. Henry, Joppa, MD (US); Monica J. Heyl, Joppa, MD (US); Dennis J. Reutter, Churchville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 98 days.

(21) Appl. No.: 10/825,802

(22) Filed: Apr. 5, 2004

Related U.S. Application Data

(62) Division of application No. 10/212,652, filed on Aug. 5, 2002, now Pat. No. 6,715,343, which is a division of application No. 09/777,483, filed on Feb. 6, 2001, now Pat. No. 6,428,122.

(51) Int. Cl.$^7$ .................................................. B01L 1/00
(52) U.S. Cl. ............................ 312/1; 312/352; 73/431; 73/40; 422/104
(58) Field of Search ...................... 73/40, 431; 312/1, 312/309, 352; 220/745; 600/21, 22; 422/104; 128/202.12, 202.13, 202.16

(56) References Cited

U.S. PATENT DOCUMENTS

| 3,907,389 | A | * | 9/1975 | Cox et al. ..................... 312/1 |
| 4,111,753 | A | * | 9/1978 | Folsom et al. ................. 435/3 |

* cited by examiner

Primary Examiner—Daniel S. Larkin
(74) Attorney, Agent, or Firm—William W. Randolph; Ulysses John Biffoni

(57) ABSTRACT

A portable containment system includes a glovebox apparatus, a self-contained filter unit, and removable conduits extending therebetween. The glovebox apparatus includes a first module for releasably covering a first sidewall opening. The first module, which has body and flange portions, has a storage position where the body portion is positioned through the first sidewall opening into the glovebox interior and an operative position where the body portion is positioned exterior of the glovebox. The glovebox apparatus includes second modules for releasably covering a second sidewall opening where the second modules are smaller than the first sidewall opening for inserting the second modules into the interior of the glovebox for storage. The filter unit includes a plurality of gas filters, an air pump, and detectors for monitoring the air flow through the system.

3 Claims, 15 Drawing Sheets

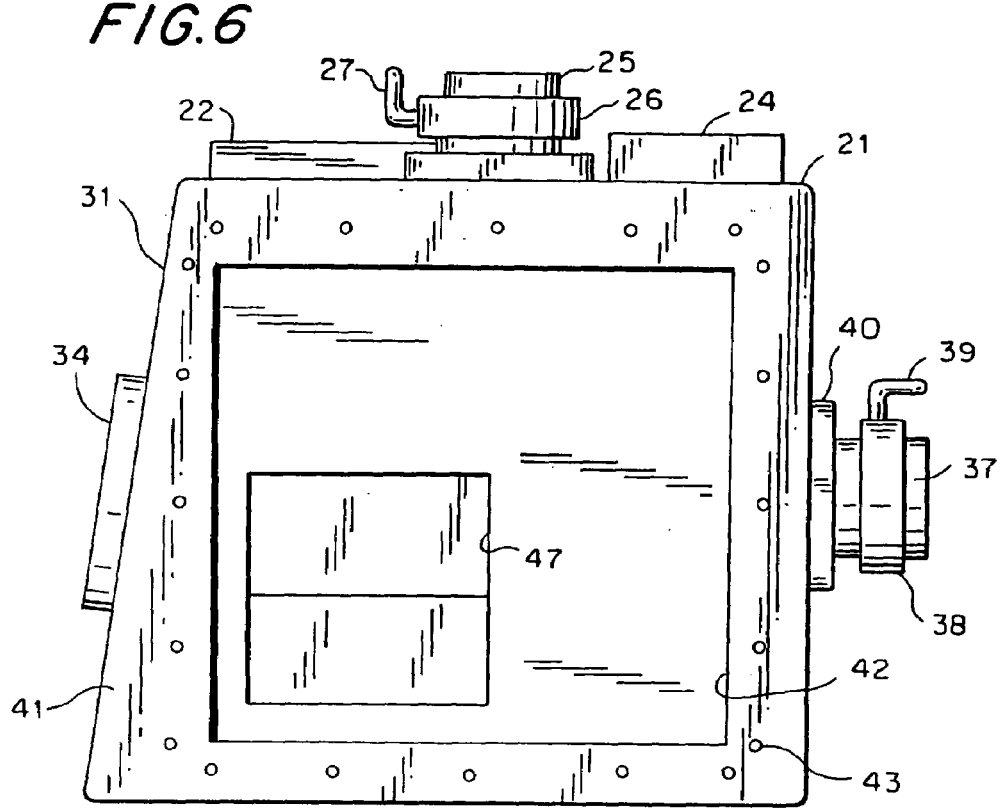
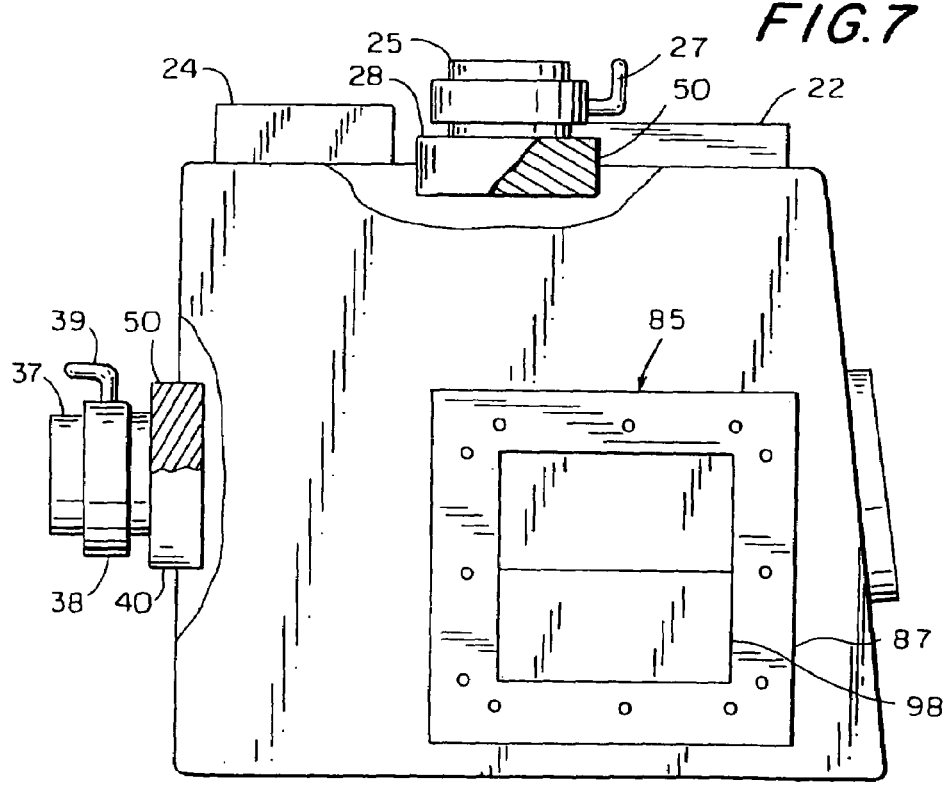

PORTABLE GLOVEBOX AND FILTRATION SYSTEM

CROSS-REFERENCE TO RELATED APPLICATIONS

This application is a division of application Ser. No. 10/212,652 filed Aug. 5, 2002, now U.S. Pat. No. 6,715,343, which is a division of application Ser. No. 09/777,483, filed Feb. 6, 2001, now U.S. Pat. No. 6,428,122.

BACKGROUND OF THE INVENTION

This invention generally relates to environmental containment equipment, and more particularly, to portable containment equipment that can be safely and readily deployed at remote locations.

Environmental accidents, toxic chemical spills, and testing to support treaty verification inspections are examples of situations where chemical and biological testing may be required at remote sites. Investigators at these sites often perform tests and acquire evidence with limited reliable information on the makeup or concentrations of the possible hazardous substances. At these sites, many tests are performed in the open air, or with improvised engineering controls, thereby relying on wind direction and individual physical protection for their own safety. The availability of safe, reliable, and efficient containment vessels, such as gloveboxes and fume hoods, for conducting on-site environmental tests would help to protect the investigators and preserve the evidentiary value of the collected materials and the on-site tests.

Examples of gloveboxes, fume hoods, chemical analyzer cabinets, containment vessels, isolation housings, and related enclosures are set forth in U.S. Pat. No. 3,777,736 (Van Der Waaij, et. al.); U.S. Pat. No. 3,926,597 and 4,548,627 (Landy); U.S. Pat. No. 4,495,146 (Gheri); U.S. Pat. No. 4,662,231 (Schaarschmidt); U.S. Pat. No. 4,704,951 (Pruchon); U.S. Pat. No. 4,838,098 and 4,909,065 (Barney); and U.S. Pat. No. 5,083,558 (Thomas). Further examples are set forth in U.S. Pat. No. 5,087,360 (Wright); U.S. Pat. No. 5,247,547 and 6,017,376 (Doig); U.S. Pat. No. 5,257,957 (Diccianni); U.S. Pat. No. 5,517,427 and 5,537,336 (Joyce); U.S. Pat. No. 5,558,112 (Strieter); U.S. Pat. No. 5,713,791 (Long); U.S. Pat. No. 5,716,525 (Nickerson); and U.S. Pat. No. 5,730,765 (Henry, et. al.), which is assigned to the U.S. Army.

SUMMARY OF THE INVENTION

The present invention is directed to a portable containment system consisting of a modular glovebox apparatus and self-contained filter system that can be readily transported and deployed.

The modular glovebox apparatus includes a storage container for the glovebox for storing the glovebox when not in use. When the modular glovebox apparatus has been moved to an intended site, the glovebox is deployed by opening the storage container. The storage container comprises a base section and a removable cover, wherein the base section has upper and lower surfaces and the glovebox is mounted on the upper surface of the base. The cover has a top portion and sidewalls depending therefrom to define an opening at the bottom of the cover.

The glovebox unit has top and bottom surfaces, front and rear walls, and first and second sidewalls, wherein the sidewalls have openings formed therein for access to the interior of the glovebox. The glovebox includes a first module releasably secured to the first sidewall of the glovebox for covering the opening in the first sidewall and for providing a means for introducing items into and removing items from the interior of the glovebox, wherein the first module has a body portion and a flange extending therefrom for surrounding and sealing the opening in the first sidewall. When not in use, the first module has a storage position where the body portion of the first module is positioned in the interior of the glovebox through the opening in the first sidewall and where the flange is secured to the first sidewall. When the glovebox is in use, the first module has an operative position where the body portion is positioned exterior of the glovebox and the flange is secured to the first sidewall. The glovebox also includes a second module releasably secured to the second sidewall of the glovebox for covering the opening in the second sidewall, wherein the second module is selected from the group of a dunk tank, a shelf, a light unit, or other equipment. The opening in the first sidewall is larger than the opening in the second sidewall and the second modules have dimensions which are less than the dimensions of the opening in the first sidewall for inserting the second modules through the opening in the first sidewall into the interior of the glovebox for storage when the glovebox is not in use.

The containment system also includes a filter or filtration system having a filter unit for holding a plurality of gas filters; an outlet conduit extending between and releasably connected to the glovebox and the filter unit; an inlet conduit extending between and releasably connected to the glovebox and the filter unit; and a pump means connected to the filter unit for circulating gas from the glovebox, into the outlet conduit, through the filter unit, and into the inlet conduit. The filter unit includes a housing comprising a bottom surface, a first end wall, a second end wall, sidewalls extending therebetween, and a top surface which has a central opening formed therein. A first moveable plate means is positioned within the interior of the housing adjacent to the first end wall, wherein the first moveable plate means has a duct formed therethrough. A first adjustment means is connected to the first end wall and the first moveable plate means for moving the first moveable plate means relative to the first end wall. A first flexible conduit means is connected to and extends between a passage in the first end wall and a duct in the first moveable plate means for carrying gas from the outlet conduit of the glovebox, through the first end wall, and through the first moveable plate means. A second moveable plate means is positioned within the interior of the housing adjacent to the second end wall; wherein the second moveable plate means has a duct formed therethrough. A second adjustment means is connected to the second end wall and the second moveable plate means for moving the second moveable plate means relative to the second end wall. A second flexible conduit means is connected to and extends between a passage in the second end wall and the duct in the second moveable plate means for carrying gas from the second moveable plate means, through the second end wall, and into the inlet conduit for the glovebox. Filter units are positioned in the housing between the first and second moveable plate means, and the first and second adjustment means are utilized to move the first and second moveable plate means towards each other to clamp the filter elements therebetween. Bag means are releasably secured around the central opening of the housing for sealing the opening of the housing.

The containment system, which includes a modular glovebox, a filter unit, conduit means connecting the glovebox to the filter unit, air pressure detectors connected to the glovebox and the filter unit, pump means for circulating air through the containment system, and alarm means, provides a method of detecting leaks in the system, whereupon air pressures are measured in the glovebox and the filter unit and the difference in air pressures in the glovebox and the filter unit is determined. An alarm is activated if the difference in air pressures exceeds a predetermined value. Preferably, measurements of the air pressure and air flow in the filtration unit are taken at the filter elements. An alarm can also be activated where the change in measured air flow during a time period exceeds a predetermined value. When an alarm is activated or for servicing and storage, the various valve means connected to the glovebox, filter system and conduits can be closed to isolate the components of the system.

The particular arrangement of the glovebox and the first and second modules provides a method for compact and organized storage of the components wherein the first module is first disconnected from the glovebox. Then the second modules are inserted through the first opening of the glovebox into the interior of the glovebox for storing the second modules therein. The first module then repositioned to a storage position where the body portion of the first module is inserted into the interior of the glovebox, and the flange of the first module is then secured to the glovebox.

Accordingly, one object of the present invention is to provide a portable containment system that can be readily transported and deployed at remote locations.

Another object of the present invention is to provide a containment system of efficient design that includes a self-contained glovebox and a filter system with replaceable filter elements.

A further object of the present invention is to provide a modular containment system that can be efficiently adapted for different requirements.

These, together with still other objects of the invention, along with the various features that characterize the invention, are pointed out with particularity in the appended claims.

BRIEF DESCRIPTION OF THE DRAWINGS

Other objects and advantages of the invention will become apparent upon reading the following detailed description with reference to the attached drawings, wherein:

FIG. 6 is a view of one side of a glovebox;

FIG. 7 is a view of another side of a glovebox;

DETAILED DESCRIPTION OF THE INVENTION

Figure 1:
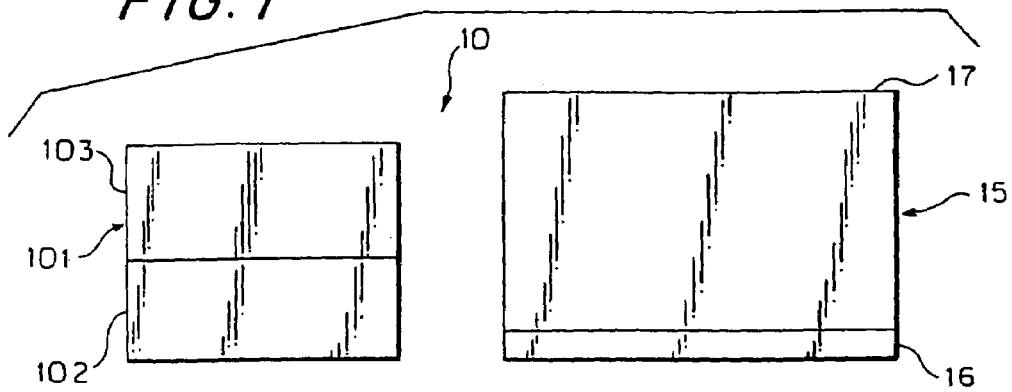
FIG. 1 is a view of the containers for an environmental containment system.
Figure 2:
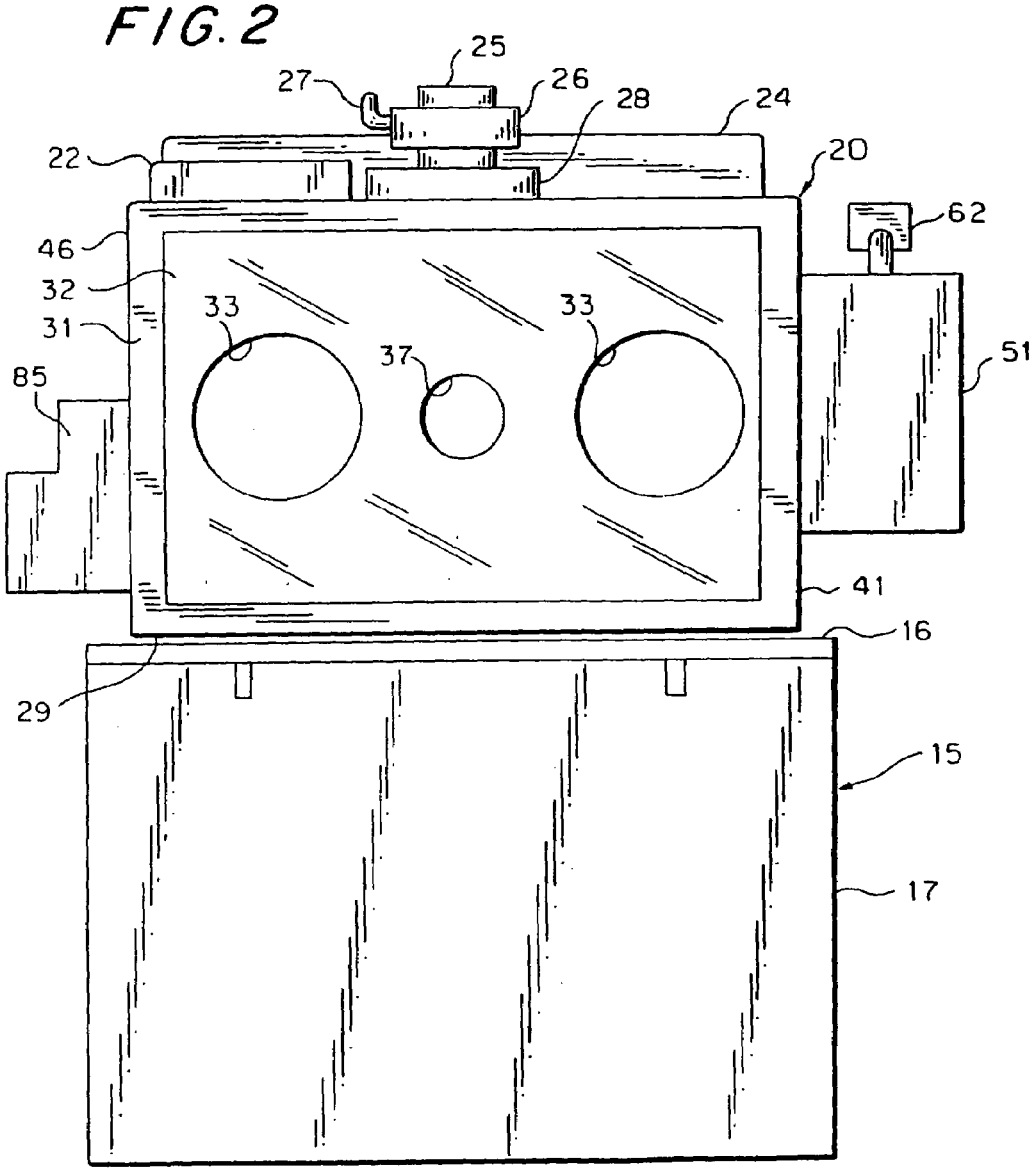
FIG. 2 is a front view of a glovebox deployed for use and mounted on a storage container.
Figure 3:
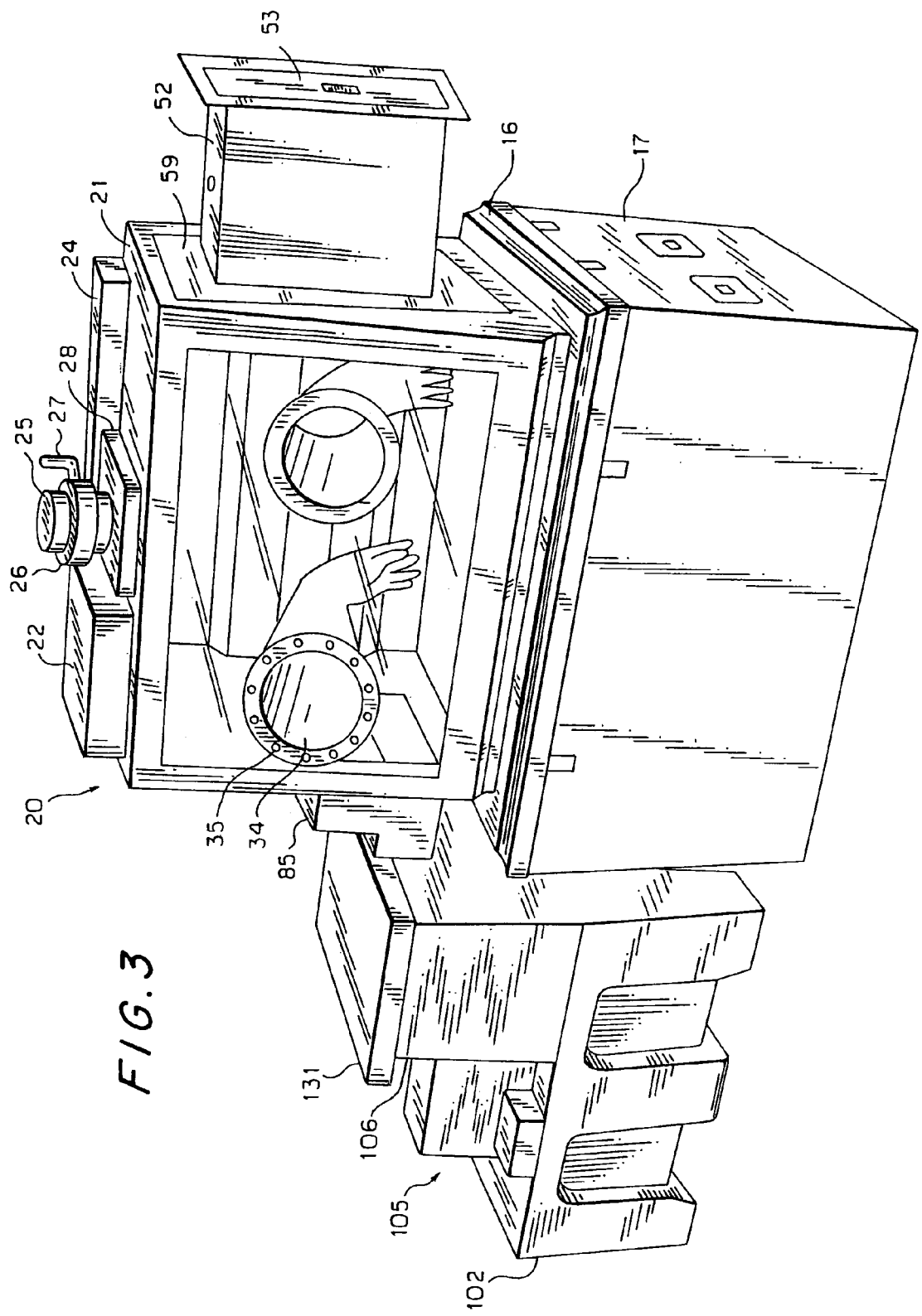
FIG. 3 is a front perspective view of a glovebox and filtration system.
Figure 4:
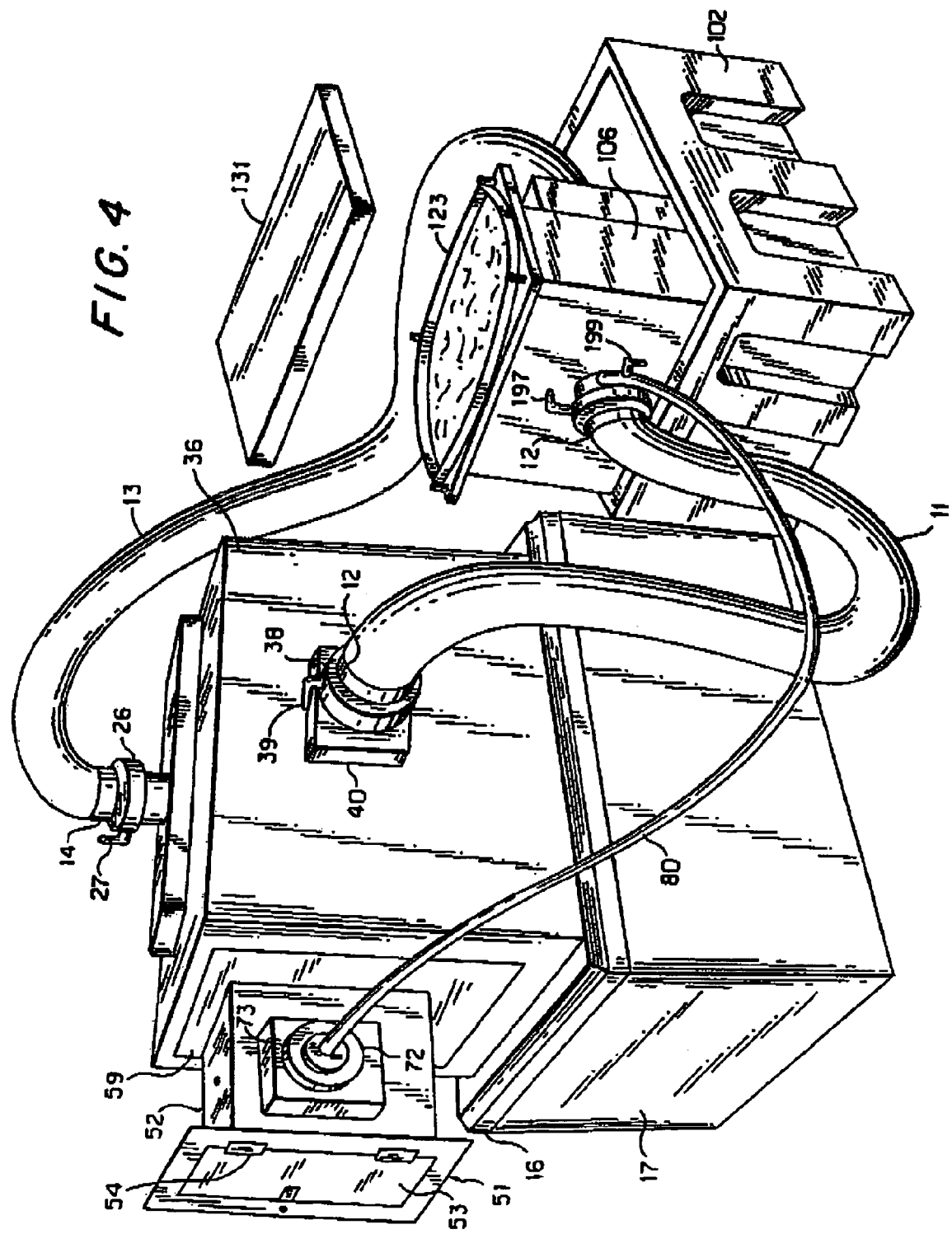
FIG. 4 is a rear perspective view of a glovebox and filtration system assembled for use.

Referring now to FIG. 1, there is generally shown a self-contained portable containment system 10, comprising a first storage container 15, which holds an isolation chamber or glovebox 20, and a second storage container 101, which holds a filtration or filter system 105. The first storage container 15 comprises a base section 16 and an upper section or cover 17. FIG. 2 illustrates a deployed position where the cover 17 has been lifted off the glovebox unit 20 and then the glovebox 20 and the base 16 have been mounted on the cover 17. As shown in FIG. 1, the second storage container 101 comprises a lower section 102 and a removable upper section 103. During use, the filtration system 105 can remain supported within the lower section 102, as shown in FIGS. 3 and 4. Storage of the glovebox and the filtration system in portable containers allows the devices to be transported to remote locations in a safe and efficient manner.

FIGS. 1 through 8 generally depict an arrangement showing how the containment system 10 could be deployed for use, where the glovebox 20 and base 16 are mounted on the cover 17, and where the filtration system 105 is mounted in the lower section 102 of the second storage container 101. Detachable conduits 11 and 13 are used to connect the glovebox 20 to the filtration system 105. In the embodiment of FIG. 4. conduits 11 and 13 are provided with readily detachable fittings 12 and 14.

As further depicted in FIGS. 1 through 8, the glovebox 20 generally comprises an enclosure having top and bottom surfaces 21, 29, front and rear walls 31, 36, and first and second sidewalls 41, 46, wherein the sidewalls have openings 42, 47 formed therein for access to the interior of the glovebox 20. FIGS. 4, 6, and 7 depict outlet or exhaust passages 37 formed in the rear wall 36 of the glovebox 20 for the removal of gas from the interior of the glovebox. A valve device 38 having a control lever 39, such as a butterfly valve or a slide valve, is provided to selectively open and close the outlet passages 37. As depicted in FIG. 7, a casting 40 is formed around the outlet passage 37 for holding removable filters 50, preferably HEPA filters, that are inserted into the casing from the interior of the glovebox 20. The front wall 31 of the glovebox is constructed of a clear panel of glass or plastic 32 that has two gloveports 33 formed in the panel for receiving gloves 34 which are attached to the clear glass or plastic panel 32 with fastening elements 35, as shown in FIG. 3. The top surface 21 of the glovebox 20 is provided with a control panel 22, a light unit 24 that illuminates the interior of the glovebox, and an inlet passage 25 for introducing air into the interior of the glovebox. The inlet passage 25 also includes a valve device 26 and a control lever 27, such as a butterfly valve or a slide valve, to selectively open and close the valve. Surrounding the inlet passage 25 is a casing 28 for holding a filter 50, preferably a HEPA filter, that is inserted into the casing 28 from the interior of the glovebox.

Figure 5:
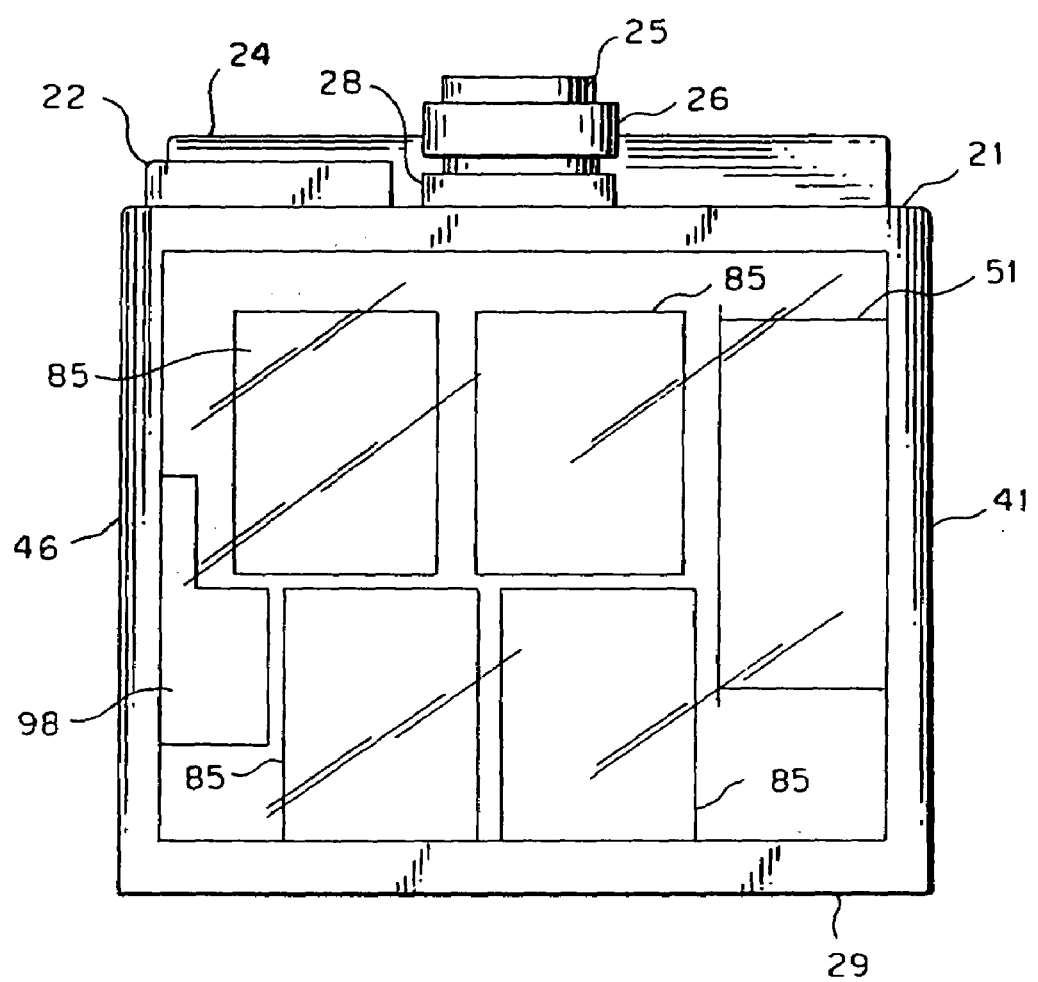
FIG. 5 is a front view of a glovebox arranged for storage.
Figure 8:
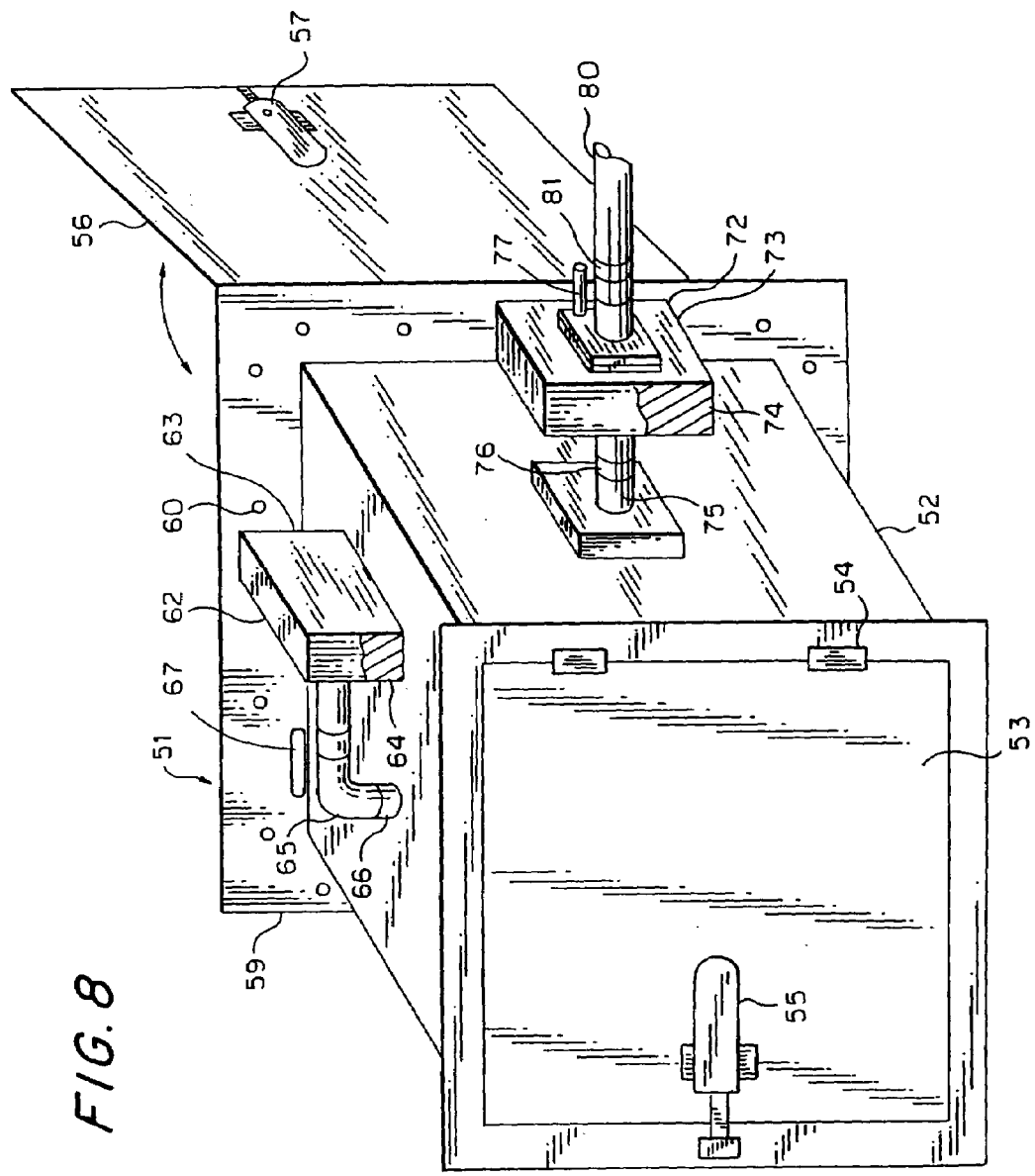
FIG. 8 is a view of a modular device for introducing items into a glovebox.
Figure 9A:
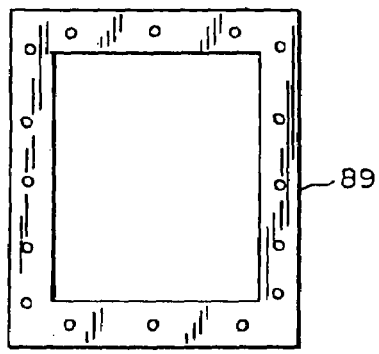
FIGS. 9A–9F are views of different modules for the glovebox.
Figure 9B:
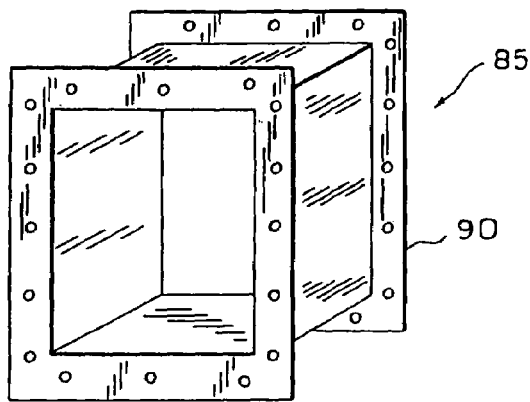
Figure 9C:
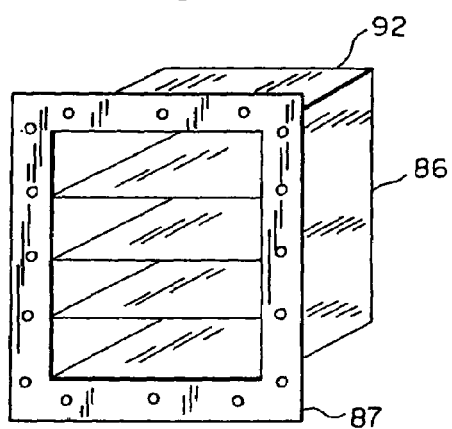
Figure 9D:
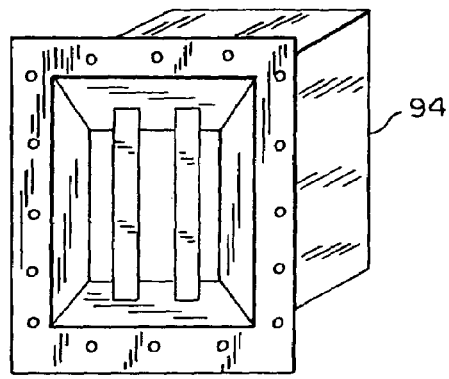
Figure 9E:
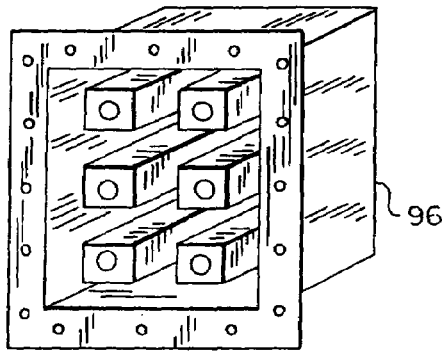
Figure 9F:
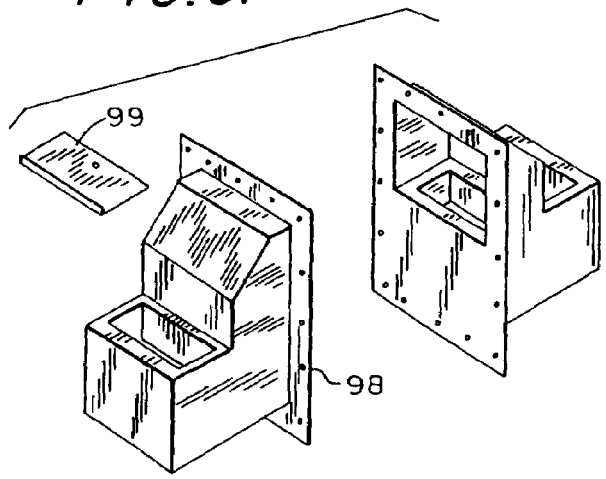

FIG. 8 depicts a first module means, preferably in the form of a double door module 51, that is removably secured to the first sidewall 41 of the glovebox 20 for covering the opening 42 in the first sidewall and for providing a means for introducing items into and removing items from the interior of the glovebox. Generally, the first module means, such as a pass-through or double door module 51, comprise a body portion 52 and a flange means or flange 59 extending therefrom for surrounding and sealing the opening 42 in the first sidewall 41. When not in use, the double door module 51 has a storage position where the body portion 52 of the device is positioned within the interior of the glovebox through the opening 42 in the first sidewall, as generally depicted in FIG. 5, and where the flange 59 is then secured to the first sidewall 41, as generally depicted in FIG. 5. FIG. 5 also depicts an arrangement where other modular devices are stored within the glovebox. After the glovebox 20 is withdrawn from the storage container, the flange 59 of the double door device 51 is disconnected from the sidewall 41 and the body portion 52 is withdrawn from the interior of the glovebox. Then, the other modules are withdrawn from the interior of the glovebox. The double door module 51 is then moved to an operative position where the body portion 52 is positioned exterior of the glovebox and the flange 59 is connected to the first sidewall 41. Openings or holes 60 in the flange 59 are fitted over studs 43 projecting from the first sidewall 41 and nuts are screwed onto the studs 48 used to create an airtight seal between the first sidewall 41 and the flange 59.

The double door device 51 includes an entrance or outer door 53, attached with hinge elements 54 as shown in FIGS. 4 and 8, and an inner or exit door 56 attached to the body or box portion 52 so that when items are to be inserted into the interior of the glovebox, the entrance door 53 is opened to insert an item into the double door device and the inner door 56 is then opened to move the item into the interior of the glovebox only after the entrance door 53 is closed. Manual latch devices 55, 57 are provided on the outer and inner doors 53, 56. Air filters devices 62, 72 can be connected to the double door device 51 for filtering air drawn into the glovebox. As shown in FIG. 8, a first air filter device 62 includes a casing 63 for holding a filter element 64, such as a HEPA filter, an inlet hose 65 connecting the casing to the double door device 51, a shut-off valve 67, and connection fittings 66 for allowing the inlet hose and the casing to be disconnected from the double door device. A lower or second air filter device 72 includes a casing 73 for holding a filter element 74, such as a HEPA filter, an inlet hose 75 connecting the casing 73 to the rear portion of the double door device 51, a shut-off valve 77, and connection fittings 76 for allowing the inlet hose 75 and the casing 73 to be disconnected from the double door device. A flexible outlet hose 80, which is provided with connection fittings 81, is removably connected to the shut off valve 77, connection fittings 81, and the filtration system for conveying air from the double door device 51, through the outlet hose 80, and into the filtration system 105.

As indicated above, the glovebox 20 also functions as a storage receptacle for different second module means 85 that are designed to be releasably attached to the second sidewall 46 of the glovebox 20 for covering the opening 47. The second module means are selected from the group of a flat panel 89, an extension duct 90 for joining adjacent gloveboxes, a shelf unit 92, a UV light unit 94, a self contained power supply 96, and a dunk tank 98, as shown in FIGS. 9A through 9E, respectively. Generally, each of the second module means includes a body portion 86 and a flange portion 87. The opening 42 in the first sidewall 41 is larger than the opening 47 in the second sidewall 46 and the second module means 85 have body and flange dimensions which are smaller than the dimensions of the opening 42 in the first sidewall 41 of the glovebox 20. This allows the second module means to be inserted through the opening 42 in the first sidewall 41 into the interior of the glovebox for storage when the glovebox is not in use. FIG. 5 depicts the situation where several of the second module means have been inserted into the interior of the glovebox for storage. The panel 89 shown in FIG. 9A may be used to cover or seal the opening 47 in the second sidewall 46 during storage.

Figure 10:
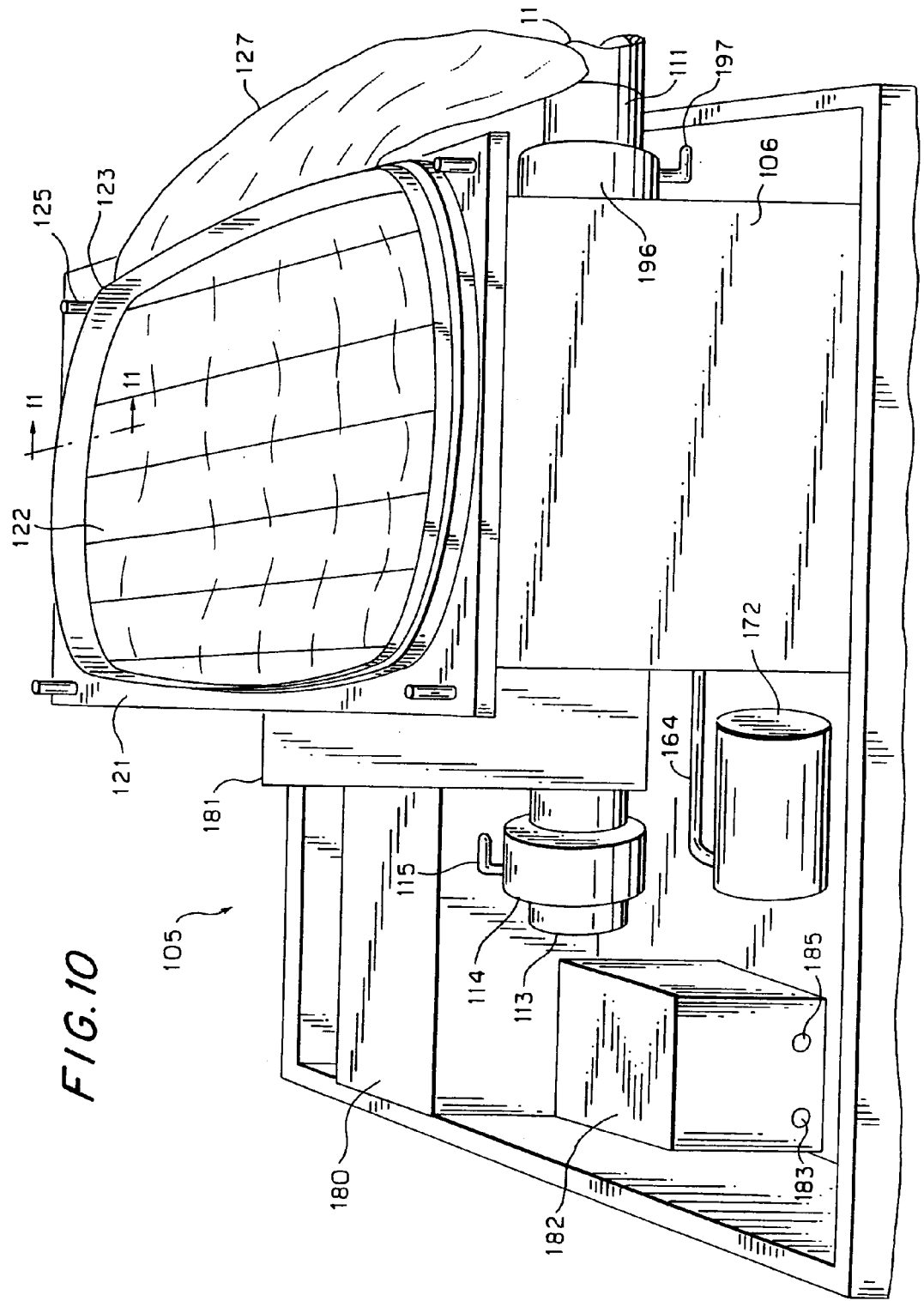
FIG. 10 is a perspective view of the filtration system.
Figure 13:
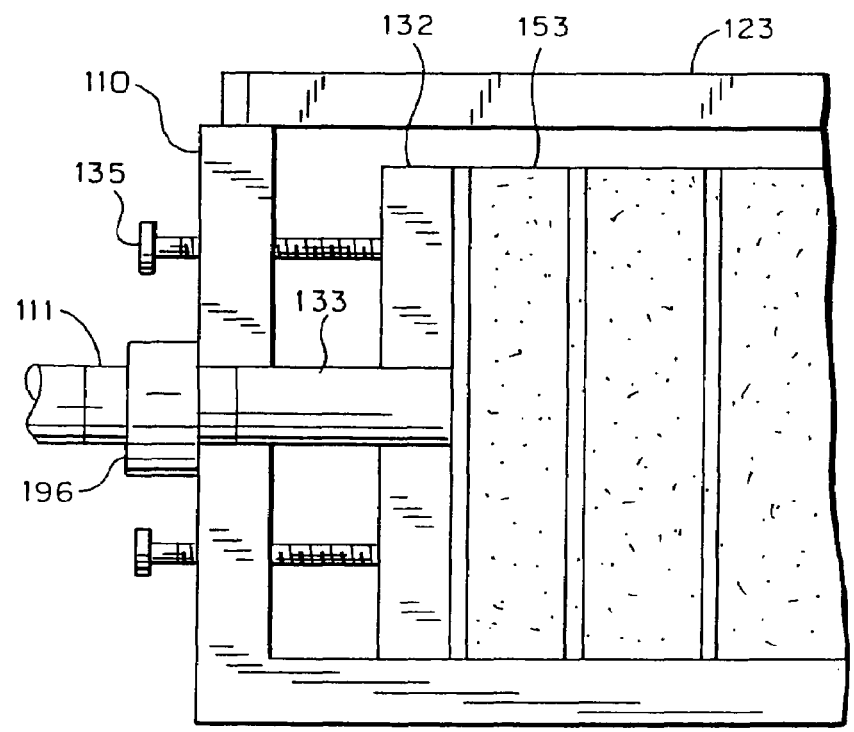
FIG. 13 is a sectional view taken along lines 13—13 of FIG. 12.
Figure 14:
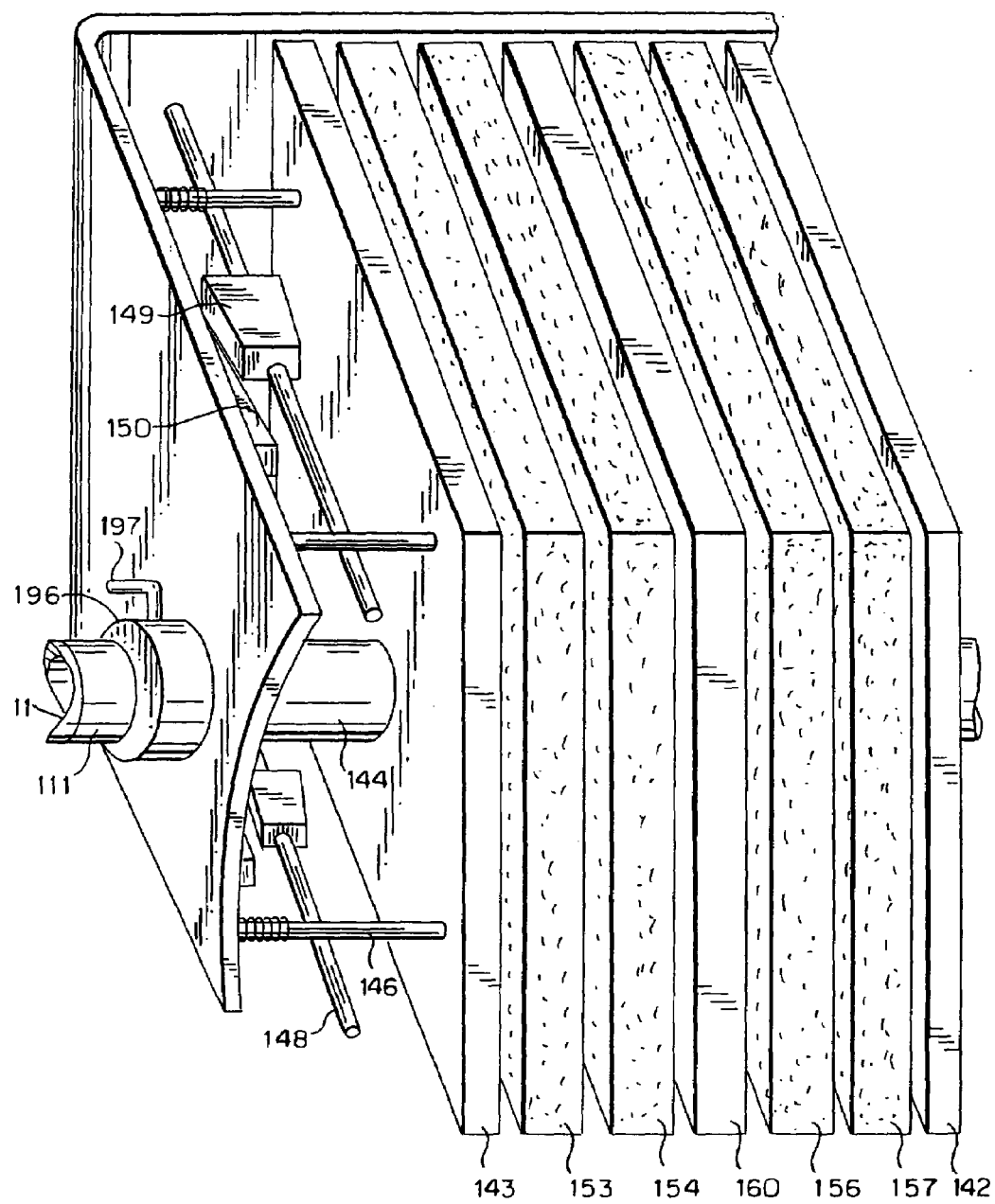
FIG. 14 is a perspective view of another means for compressing the filters in the filter unit.
Figure 15:
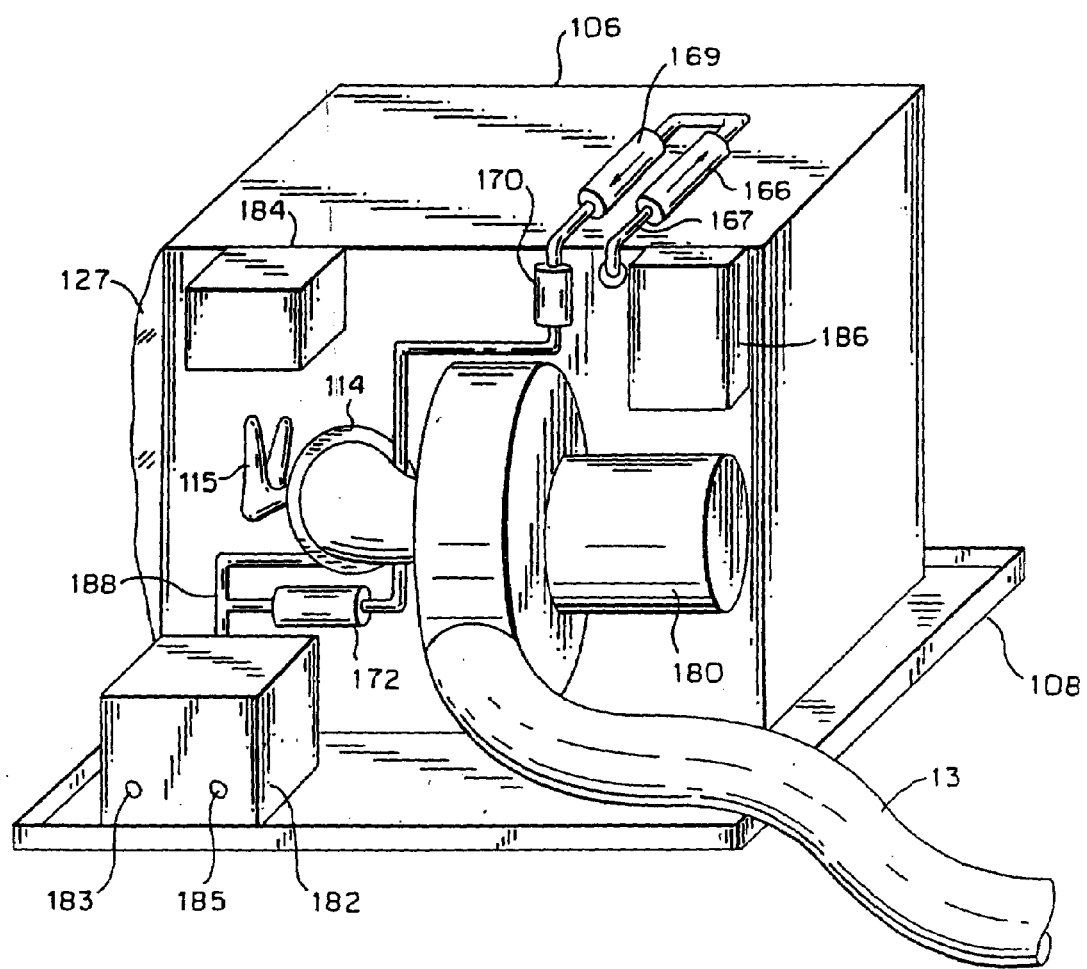
FIG. 15 is a perspective view of another arrangement of the filter unit.
Figure 16:
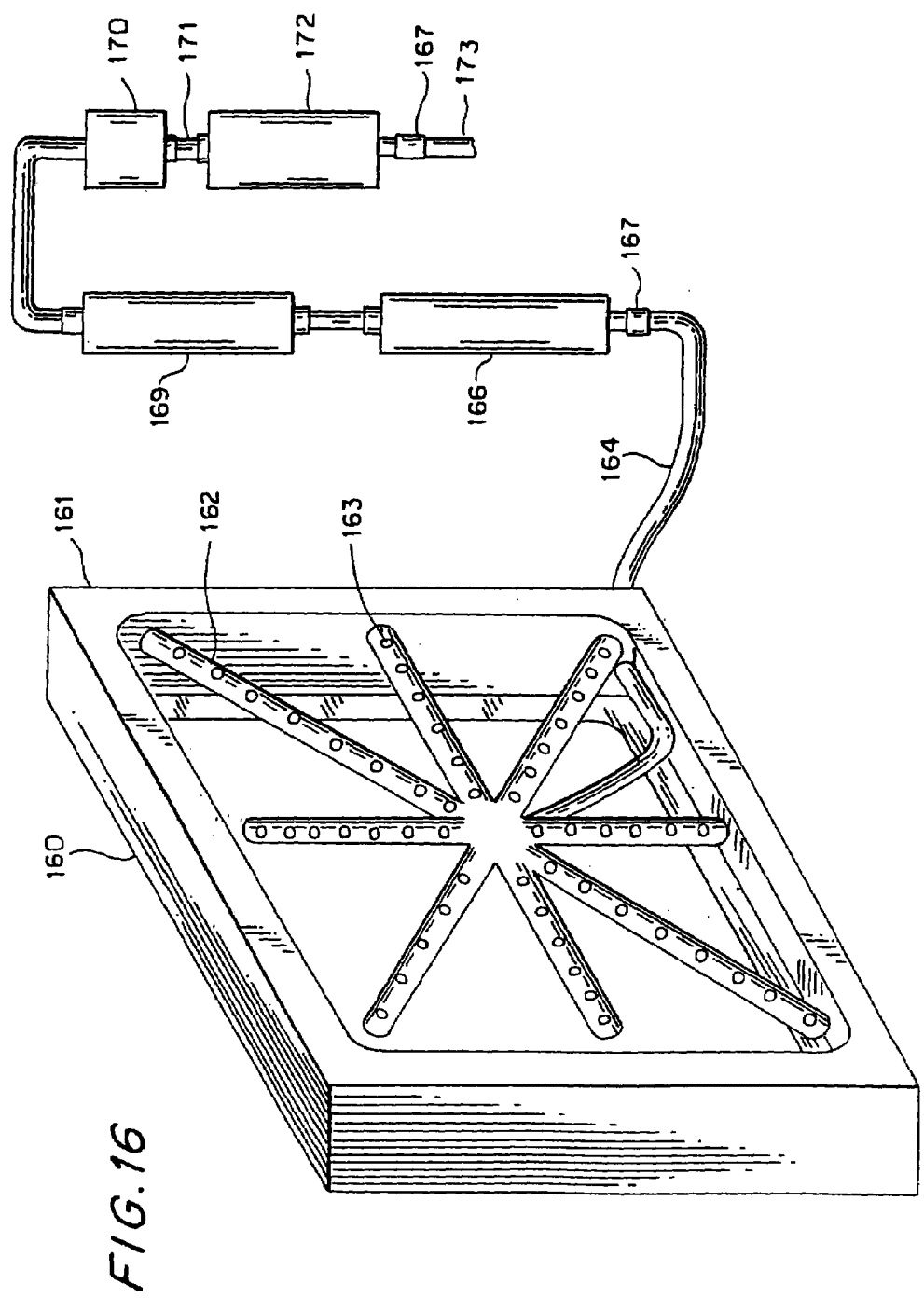
FIG. 16 is a perspective depiction of a filter element test assembly.

The filtration system apparatus 105 FIGS. 3, 4, 10 through 17 generally includes a filter unit or housing 106 for holding a plurality of air filters, a first or inlet conduit 111 secured to the filter unit 106 and releasably connected to the outlet conduit 11 from the glovebox, and a second or outlet conduit 113 secured to the filter unit 106 and releasably connected to the inlet conduit 13 for the glovebox. Also included in the filtration system 105 is a pump means, such as a Dayton direct drive blower from Granger, which is connected to the filter unit 106 for pumping and circulating gas from the glovebox 20, into the outlet conduit 11 from the glovebox, through the filter unit 106, and back into the inlet conduit 13 for the glovebox. The filtration system 105 further includes control means that include common Dwyer gauges 184, LED indicators, piezo-electric alarms 183 and vacuum pumps 172, such as shown in FIGS. 10, 15, and 16 for monitoring, controlling, and testing the operation of the containment system. The inlet and outlet conduits 111, 113 of the filter unit 106 preferably include shut-off valves 114, 196 having control levers 115, 197 such as a butterfly or a slide valve. This permits efficient control of the air flow and circulation through the containment system and allows the filtration system to be closed off and detached from the glovebox for servicing or for scaling the filtration system during shipment and storage.

Figure 11:
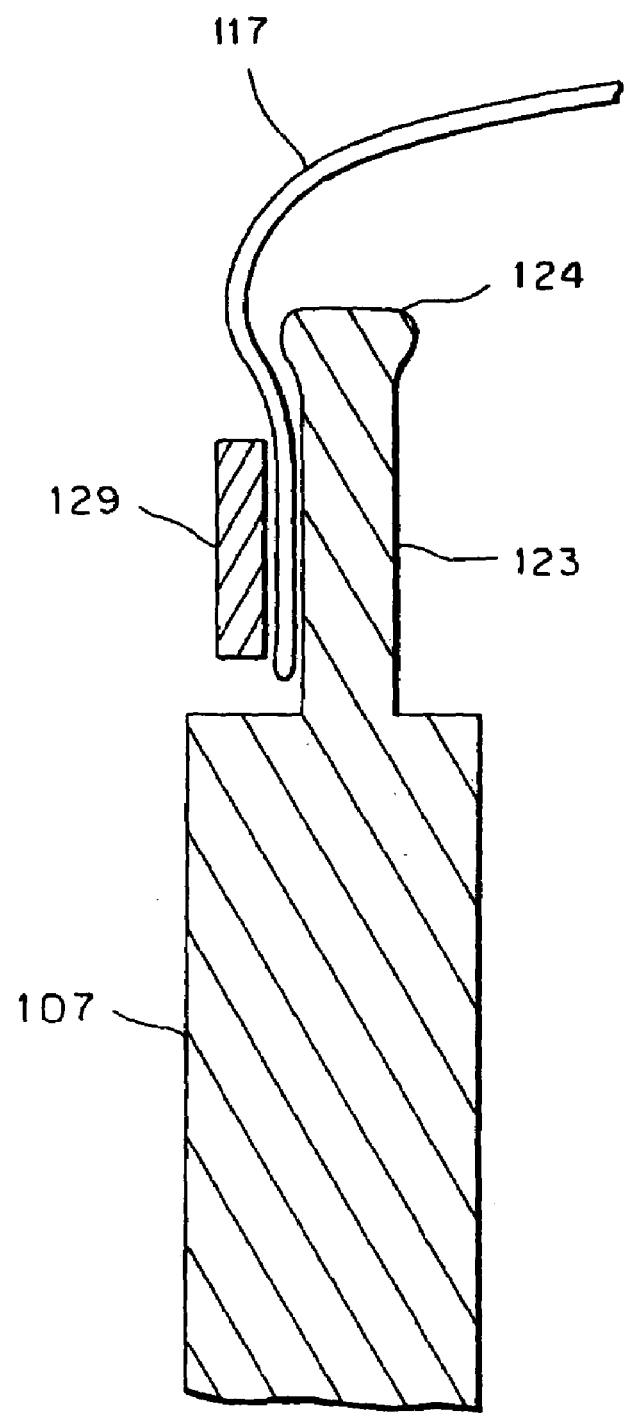
FIG. 11 is a sectional view of FIG. 10, taken along lines 11—11.
Figure 12:
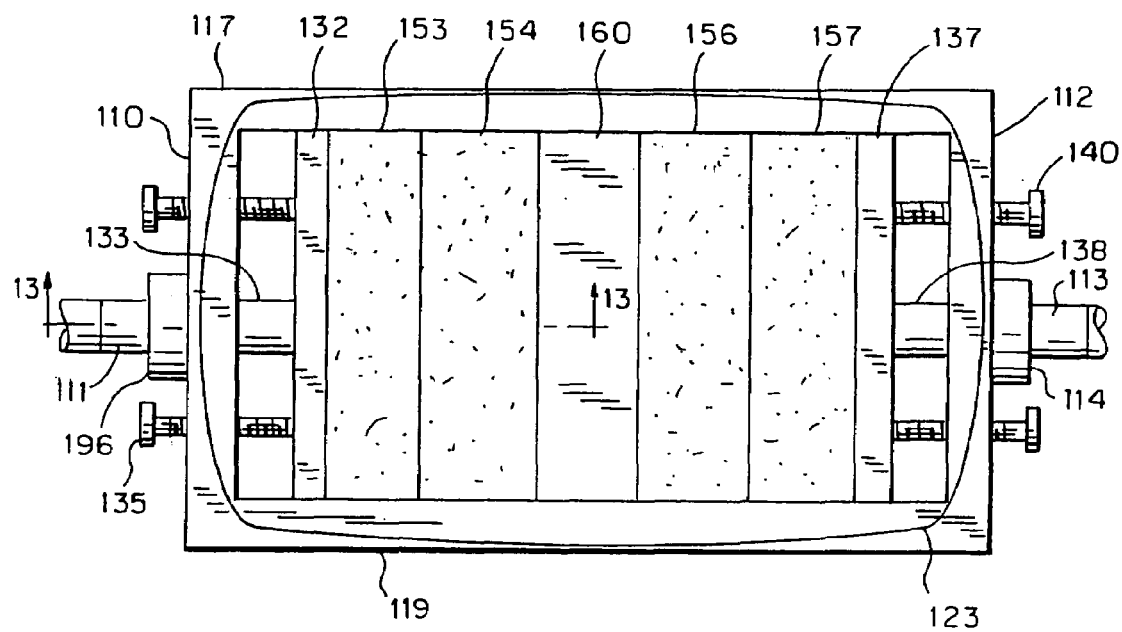
FIG. 12 is a top view of one means for compressing the filters in the filter unit.

The filter units of FIGS. 10 through 17 generally comprise a housing 107 having a bottom surface 108, a first end wall 110, a second end wall 112, sidewalls extending therebetween 117, 119, and a top or exposed surface 121 which has a central opening 122 formed therein. The first and second end walls 110, 112 have passages formed therein for receiving the inlet and outlet conduits or ducts 111, 113 for the filter unit 106. As shown in FIGS. 10, 11, and 13, the top or exposed surface portion 121 of the filter unit is provided with an upstanding circumferential flange 123 that surrounds the opening 122 and forms a means for receiving a flexible bag 127 for covering the opening. The bag 127 is then clamped or sealed to the circumferential flange 123 with a band 129 of metal or plastic. Also shown in FIG. 10 are posts 125 which serve as rests or stops for the cover 131 of FIG. 4, constructed of metal or hard plastic, that may be lowered to engage the lip 124, shown in FIG. 11, of the circumferential flange 123 to form an additional seal for the opening.

In the embodiment of FIGS. 12 and 13, filter units are compressed to maintain an air seal at the joints between the individual filters that have been inserted into the opening 122 in the housing 107. This is accomplished with a first moveable plate means 132 positioned within the interior of the housing adjacent to the first end wall 110, wherein the first moveable plate means has a passage formed therethrough. A first adjustment means, preferably in the form of threaded adjusting elements 135, are connected to the first end wall 110 and the first moveable plate means 132 for moving the first moveable plate means relative to the first end wall. A first flexible pipe means 133 is connected to and extends between the inlet tube or conduit 111 in the first end wall 110 and the passage in the first moveable plate means 132 for carrying air from the first end wall to the first moveable plate means. A second moveable plate means 137 is positioned within the interior of the housing adjacent to the second end wall 112 of the filter housing 107, wherein the second moveable plate means has a duct or passage formed therethrough. A second adjustment means 140 is connected to the second end wall 112 and the second moveable plate means 137 for moving the second moveable plate means relative to the second end wall of the filter housing for cooperating with the first moveable plate means for clamping the filter elements there between. A second flexible pipe means 138 is connected to and extends between the passage in the second moveable plate means 137 and the duct 113 in the second end wall 112 for carrying gas from the second moveable plate means, through the second end wall, and into the outlet conduit. Filter units are positioned in the housing between the first and second moveable plate means and the first and second adjustment means are utilized to move the first and second moveable plate means towards each other to clamp the filter elements therebetween.

FIG. 14 depicts another arrangement for clamping the filter elements. The filter elements are clamped between a moveable plate means or moveable plate 143 and either a fixed plate means 142 or end wall 112. While only a single moveable clamping arrangement is shown, two moveable clamping plates could be also be used. The mechanism comprises spring-biased horizontal rods 146, which are connected to an end wall 110 of the housing and the moveable plate member 143, and threaded, transverse adjustment bars 148 that are connected to the horizontal rods 146 and the sidewalls 117, 119 of the housing. Attached to the horizontal rods and the adjustment bars are blocks 149, 150 or camming surfaces, which move to engage each other as the adjustment bars are rotated, and which operate to compress the filter elements between the moveable plate means and the fixed plate means. A flexible conduit 144 is connected to the moveable plate means 143 and the conduit 11.

A preferred arrangement of filters is shown in FIGS. 10 through 14 where, as referenced from the inlet conduit, a HEPA filter is normally positioned as the first filter 153 in arrangement for blocking particulates such as biological aerosols. The next filter in the arrangement normally comprises a carbon filter 154 for absorbing gasses such as toxic fumes. Then a spacer panel 160 is used which, as depicted in FIG. 16, normally contains test equipment for collecting gasses that have passed through the first carbon filter and for testing the continuity of the system. Downstream of the spacer is a second carbon filter 156 for trapping errant gasses that have escaped the other filters. The last filter 157 in the arrangement is a second HEPA filter for trapping any remaining particulates that may have been shed by the carbon filters in the system.

The spacer panel assembly of FIG. 16 normally functions as a test means for testing the operability of the filter system and for detecting any malfunctions during operation. The spacer panel 160 comprises a circumferential housing 161 and a plurality of tubes 162 radiating outwardly from the center of the spacer panel, wherein the tubes have perforations 163 for receiving air passing through the spacer panel. A small tube 164, which is connected to the center of the perforated tubes, is connected to a sorbent trap 166 for removing organic molecules. Shut-off valves 167 are provided in the tubing to permit the removal of the sorbent trap from the system. Downstream of the sorbent trap is a charcoal filter 169 to collect errant gasses and a flowmeter 170 for determining the flowrate and pressures within the filter system. Additional shut-off valves may be provided to permit separate removal of the components. Downstream of the flowmeter 170 is a small pump 172, such as a Thomas vacuum/pressure pump from Granger, for continuously drawing the air in the filter system into the perforated tubes, through the sorbent trap, flowmeter and pump, whereupon it is returned to the input of the filter system through a return line or tubing 188 as shown in FIG. 15. The sorbent trap, such as made of Tenax, can be removed and tested to determine the presence of any contaminants and to determine if the primary carbon filter has failed. A charcoal filter 169 is placed in-line with the sorbent trap 166 to purify the vacuumed air. A control unit 186 is used to operate the filter system.

Figure 17:
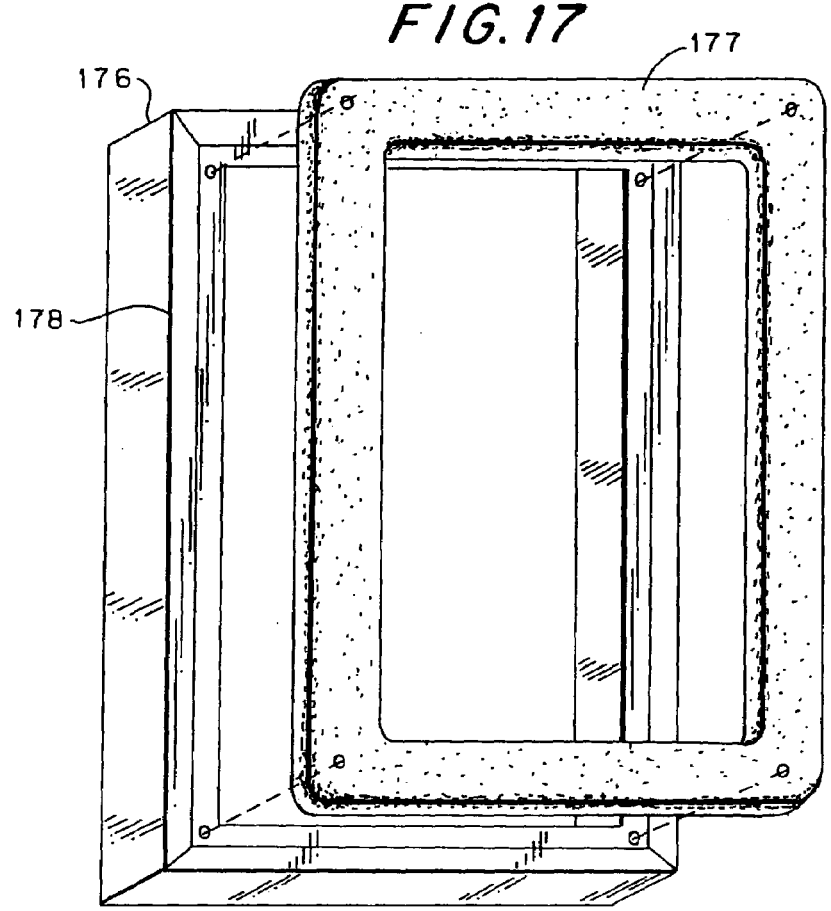
FIG. 17, is a perspective sectional view of the construction of a filter element.

A filter cover or framing for the filter materials is generally shown in FIG. 17. The cover for the filter materials comprises a rigid circumferential frame 176 of plastic or metal for receiving the filter materials and circumferential plates 177 that are attached to the circumferential frame to form a rigid structure. Gasket materials 178 are circumferentially placed around the periphery of the circumferential frame and the circumferential plates to form a tight seal when the filter elements are clamped within the filter housing.

Use of a bag means 127 that is secured and clamped over an opening 122 in the filter housing 107 constitutes one protective measure that can be employed to capture and restrain any contaminents in the event of a failure of one or more of the filter elements. Thus, if there is a failure or leak in one or more of the filter elements, the bag 127 is designed to contain any harmful substances. To remove the filter elements from the housing, the clamping plates in the housing 107 are retracted to release the clamping pressure on the filter elements and the filter elements are then drawn into the bag while the bag is still clamped to the flange 123. After the filter elements have been placed in the bag 127, the bag can be sealed with tie elements before the bag is detached from the circumferential flange 123. To protect new filter elements, the new filter elements can likewise be stored and sealed within a bag until needed. To replace the filter elements, the mouth of the replacement bag will be initially mounted around and clamped to the circumferential flange 123. Then, a tie element will be removed from around the mouth of the bag and the filter elements can be placed into the filter housing 107. A cover 131 for the filter housing comprises a possible additional means of protection. After the bag has been installed on the circumferential flange of the housing, a cover 131 can be reinstalled and clamped over the circumferential flange. As shown in FIG. 11, the upper portion or lip of the circumferential flange may have a widened portion or lip 124 to form a wider seal with the cover 131.

Figure 20:
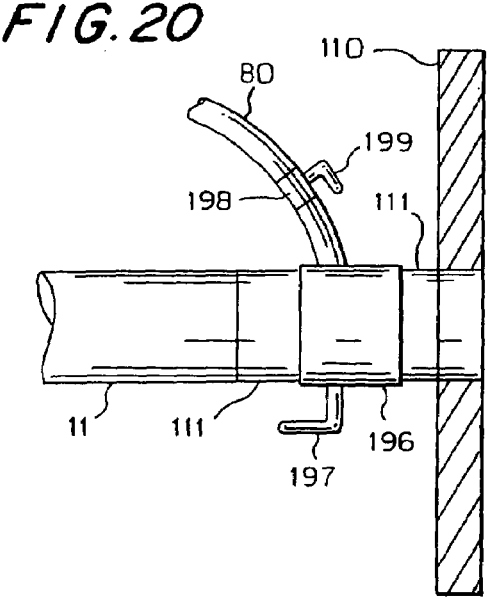
FIG. 20 is a view of the conduits that extend from the glovebox and the first module connected together at the filter unit.
Figure 18:
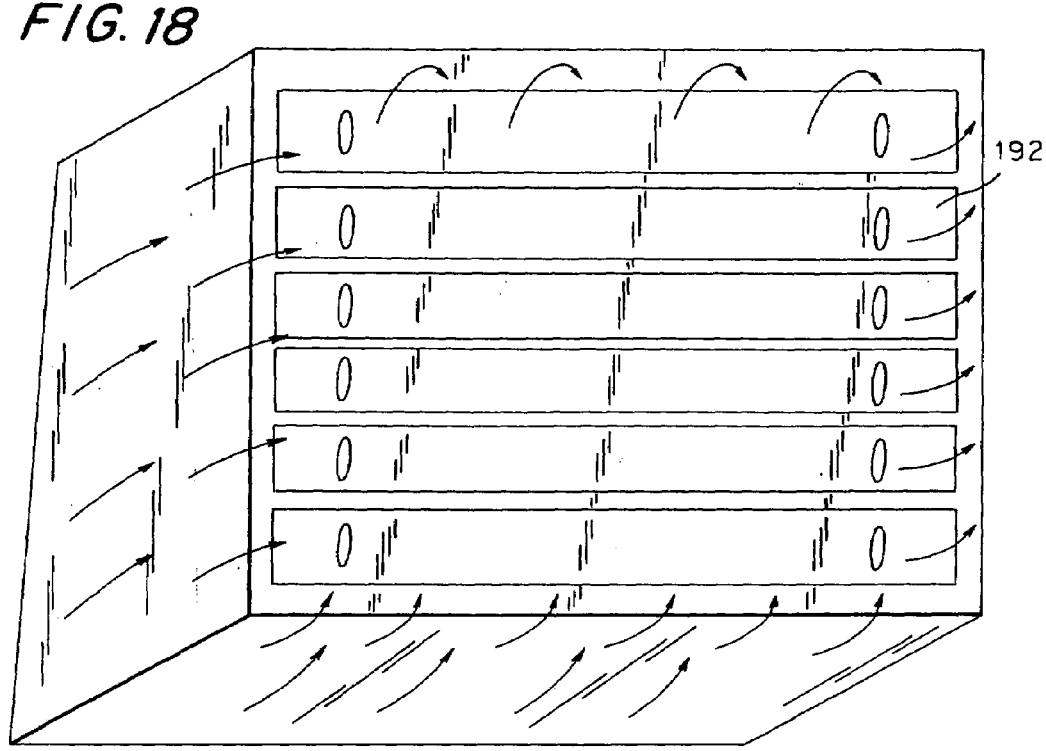
FIG. 18 is a perspective view of the glovebox deployed for use as a fume hood with a depiction of the air flow patterns therein.
Figure 19:
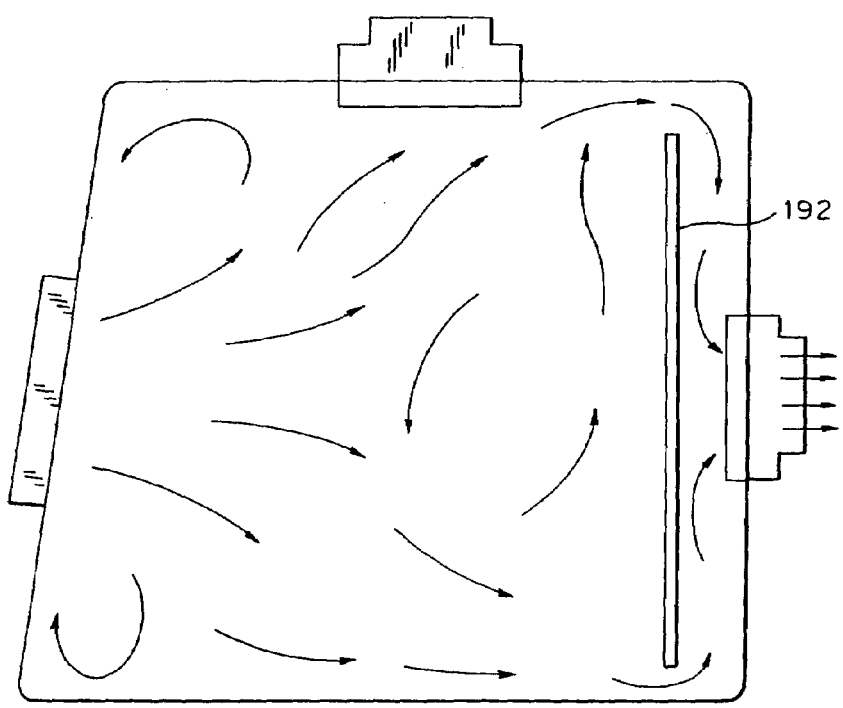
FIG. 19 is a side view of the interior of the glovebox deployed for use as a fume hood depicting the air flow patterns therein.

FIG. 20 shows an arrangement of the conduits 11 and 80 connected together at the inlet for the filtration unit. Conduit 11 is provided with a valve 196 that has a control lever 197 for shutting off the flow of air through the conduit 11 to the filtration unit. The conduit 80 can be detached from the conduit at the valve 198 to facilitate disassembly of the containment system. The conduit 80 is provided with a valve 198 having a control lever 199 and it is capable of being removed from the inlet conduit 111 for the filtration unit.

For many applications, the glovebox and the filtration system must be certified, which requires the operator to perform a series of tests to ensure that the system is operational and safe for use. A certification process normally requires that there are no leaks in any of the HEPA or other filters that would let particulates flow through and out of the system. Additionally, the filters must trap all the extraneous organic compounds from the air stream and keep them within the system during operations even when the blower motor is not operating.

Within the glovebox, the air enters through an initial HEPA filter. This ensures that no contaminate particulates are entering the system. This initial or primary HEPA filter is certified by placing a small battery powered particle counter inside the main enclosure. The particle count should be at or near zero after a five-minute period. The same process is used to certify the airlock HEPA filter attached to the double door airlock. A secondary HEPA at the rear of the primary enclosure is required to trap all particulates that may have entered the system. It is checked by connecting the battery powered particle counter to a small valve that is positioned on the intake side of the filter unit, prior to or upstream of the cut-off valve on the filter unit. Replacement HEPA filters, which are usually stored in sealed packaging, are normally tested before insertion into the glovebox casing.

In certifying the containment system, one factor is that the glovebox and the filter system should be airtight. In certifying the glovebox, the blower motor 180 is turned on and a manometer or digital magnihelic and a mechanical magnihelic, such as a standard Dwyer gauge, on blower motor and the glovebox are used to measure the pressure differential within the glovebox. Both measurements should agree. The gauges are redundant so that at least one will continue to operate if the other one fails. The pressure in the glovebox is then brought up to two (2) inches of water gauge (wg), and the inlet and outlet shut-off valves 26, 38 are closed. The glovebox should now be sealed and it should remain airtight as measured by visual inspection of the pressure gauge measurements for a predetermined period of time.

Certification that the filter system is airtight involves a similar process. With the blower motor 180 operating, the intake valves 196, 198 for the filter unit 106 are closed, forcing a vacuum to occur within the filter plenum, which comprises the compressed region that includes the HEPA, carbon, spacer, carbon, and post filters. The magnihelic gauge 184 on the filter unit will normally rise to about five (5) inches of wg in measuring the differential pressures inside and outside of the filter unit. The outlet or effluent valve 114 is then closed and the blower motor 180 is turned off. The readings on the magnihelic guage 184 should remain the same for a predetermined period of time, such as on the order of about ten (10) minutes, for the system to be certified.

With the system in operation, a common Dwyer photohelic 182 is used to measure the actual flow of air through the system, as opposed to the air pressure within the system, and it is connected to an audible alarm 183 and light array 185. This is used to notify the user when the motor blower is no longer functioning and that operations within the glovebox should be terminated. At this point the influent and effluent valves 26, 38 for the glovebox and filter valves 114, 196, and 198 would be closed to prevent compounds from leaving the controlled environment.

Additionally, an independent air sampling system is provided to capture gasses that have broken through the primary carbon filters. The air sampling system on the filter unit comprises an air pump 172 such as a Thomas vacuum pump, tubing 188, air flow meter 170 with a valve 171, a small charcoal filter 169, solid organic trapping medium 166, shut-off valve 167, and a sampling tube unit. This sampling system is used to test for possible breakthrough of the first or primary carbon filter 153 by gasses which were released from testing conducted in the glovebox. After operations have been completed and before the glovebox is prepared for storage, the sorbent tube 166 is removed from the sampling line and thermally desorbed into a gas chromatograph and mass selective or flame photometric detector. A positive reading would indicate that the primary filter would have to be replaced with a new filter. Normally, the secondary carbon filter would be repositioned as the primary filter and the new filter elements would be positioned as the secondary filter.

The double door airlock device is a removeable module that bolts to the side of the glovebox. It contains two doors and an air exchange system. The doors are intended to maintain the pressure within the glovebox when only one is open at a time and the chamber within serves as an isolation region for a sample entering or leaving the main glovebox. While contaminated objects are decontaminated prior to their passing out of the main glovebox, there is a possibility of toxic fumes entering the double door airlock once it is opened. By use of the shut-off valves and the HEPA filters for filtering the influent and effluent air streams the double door module can be cleansed. Closing of the influent valve of the glovebox will cause more air to flow through the HEPA filters attached to the double door module and the conduit 80.

The glovebox may be provided with baffle means in the form of adjustable elongated plates 192 secured to the rear wall of the glovebox with fastening elements for controlling the flow and circulation of air within the glovebox. As generally depicted in the air flow patterns of FIG. 10, the baffles help to direct the air flow to circulate, scour or remove air in the different regions of the interior of the glovebox.

The glovebox is also capable of being operated as a fume hood. In this mode, the gloves are normally removed from the front plate, allowing free access to the interior of the glovebox. The influent valve on the glovebox is closed and the air now enters only through the glove ports. The speed of the blower motor is controlled by a variable speed motor controller, such as a Leeson adjustable AC motor controller, to increase the airflow. Due to very little pressure differential between the inside and outside of the glovebox, the digital magnihelic cannot function in this mode. Actual air flow is indicated by a standard Dwyer photohelic on the filler unit.

Before being deployed, the glovebox 20 and filtration system 105 should be pressure tested to detect leaks in the systems. A visual check of the glovebox and filtration systems would include a check that the doors 53, 56 of the first module means or pass-through double door device 51 are closed; that the dunk tank 98 is filled with fluid and the lid 99 is secured; that shut-off valves 67, 77 for the first and second air filter devices 62, 72 are closed; that the gloves 34 are in place; and that the inlet valve 26 for the glovebox 20 is closed. The blower motor 180 and fan 181 for the filtration system are turned on to develop a negative pressure within the glovebox of about negative two (2) w.g., as measured by a magnehelic in the control panel 22. When the proper pressure is achieved, the outlet valve 38 is closed and the blower motor 180 is turned off. The pressure within the glovebox 20 is monitored at one (1) minute intervals until the pressure within the glovebox decays to about 75% of the initial value. The temperature and barometric pressure are then measured.

Initial operation of the glovebox 20 and filtration system 105 for conducting tests comprises closing the doors 53, 56 of the first module means or pass-through double door device 51; closing the shut-off valves 67, 77 for the first and second air filter devices 62, 72 of the first module means 51; closing the inlet valve 26 for the glovebox 20; and operating the blower motor 180 and fan 181 to develop a negative pressure within the glovebox 20. Then, outer door 53 is opened to insert the item to be tested into the first module means 51. After the outer door 53 is closed, the shut-off valves 67, 77 are opened to draw air into the first module means 51, and then the inner door 56 of the first module means 51 can be opened to bring the item into the interior of the glovebox. When tests are conducted in the interior of the glovebox, the fumes given off are drawn from the glovebox 20, through the outlet 37 and conduit 11, and into inlet conduit 111 of the filtration system 105. After being drawn through the filter elements 153, 154, 156, and 157, and 160, where fumes and other substances are removed, the blower motor 180 and fan 181 pump the air through conduit 13 and inlet valve 26 into the interior of the glovebox 20.

It should be understood that the foregoing description is only illustrative of the invention and that various alternatives and modifications can be made by those skilled in the art without departing from the principles and concepts of the invention. Accordingly, the present invention is intended to encompass all such alternatives, modifications, and variations which fall within the appended claims.

What is claimed is:

1. A method of storing a glovebox system in a compact manner when not in use, wherein the glovebox system includes a glovebox having a first opening formed in a first sidewall and a second opening formed in a second sidewall of the glovebox for access to the interior of the glovebox; a first module means releasably secured to the first sidewall of the glovebox for covering the first opening and for providing a means for introducing items into and removing items from the interior of the glovebox, wherein the first module means has a body portion and a flange means extending therefrom for surrounding and sealing the first opening, and wherein the first module means has a storage position where the body portion of the first module is positioned in the interior of the glovebox through the first opening and where the flange means is secured to the first sidewall, and wherein the first module means has an operative position where the body portion is positioned exterior of the glovebox and the flange means is secured to the first sidewall; a second module means releasably secured to the second sidewall of the glovebox for covering the second opening, wherein the second module means includes one or more of a dunk tank, a shelf, a light unit, a power unit, test equipment or a panel, wherein the first opening is larger than the second opening and the second module means has dimensions which are less than the dimensions of the first opening for inserting the second module means through the first opening in the first sidewall into the interior of the glovebox for storage when the glovebox is not in use; comprising the steps of:

disconnecting the first module means from the glovebox;
inserting the second module means through the first opening into the interior of the glovebox for storing the second module means in the interior of the glovebox;
moving the first module means to a storage position where the body portion of the first module means is inserted into the interior of the glovebox; and
securing the flange means of the first module means to the glovebox.

2. A method of storing a glovebox system in a compact manner when not in use, wherein the glovebox system includes a glovebox having a first opening formed in a first sidewall and a second opening formed in a second sidewall of the glovebox, a first module means releasably secured to the first sidewall of the glovebox for covering the first opening, wherein the first module means has a body portion and a flange means extending therefrom for surrounding and sealing the first opening, and a second module means releasably secured to the second sidewall of the glovebox for covering the second opening, wherein the first opening in the first sidewall is larger than the second opening in the second sidewall and the second module means has dimensions which are less than the dimensions of the first opening for inserting the second module means through the first opening in the first sidewall into the interior of the glovebox for storage when the glovebox is not in use, comprising the steps of:

disconnecting the first module means from the glovebox;
inserting the second module means through the first opening into the interior of the glovebox for storing the second module means in the interior of the glovebox;
moving the first module means to a position where the flange means of the first module means covers the first opening in the glovebox; and
securing the flange means of the first module means to the glovebox.

3. A method of storing a glovebox system in a compact manner when not in use, wherein the glovebox system includes a glovebox having a first opening formed in a first sidewall and a second opening formed in a second sidewall of the glovebox, a first module means releasably secured to the first sidewall of the glovebox for covering the first opening, wherein the first module means has a body portion and a flange means extending therefrom for surrounding and sealing the first opening, and a second module means releasably secured to the second sidewall of the glovebox for covering the second opening, wherein the first opening in the first sidewall is larger than the second opening in the second sidewall and the second module means has dimensions which are less than the dimensions of the first opening for inserting the second module means through the first opening in the first sidewall into the interior of the glovebox for storage when the glovebox is not in use, comprising the steps of:

disconnecting the first module means from the glovebox;
inserting the second module means through the first opening into the interior of the glovebox for storing the second module means in the interior of the glovebox;
moving the first module means to a position where the first module means covers the first opening in the glovebox; and
securing the flange means of the first module means to the glovebox.

* * * * *